United States Patent Office 3,183,275
Patented May 11, 1965

3,183,275
PREPARATION OF PARA-NITROHALOBENZENES
Allen K. Sparks, Des Plaines, Ill., assignor to Universal Oil Products Company, Des Plaines, Ill., a corporation of Delaware
No Drawing. Filed Jan. 31, 1963, Ser. No. 255,188
11 Claims. (Cl. 260—646)

This invention relates to the nitration of halobenzenes. More particularly, this invention relates to a method for increasing the amount of the paraisomer in a nitrohalobenzene nitration product.

The nitration of nitratable halobenzenes with a nitration mixture comprising equimolar amounts of nitric acid and acetic anhydride is known to the art. Nitration is generally considered to proceed through the intermediate formation of acetyl nitrate which acts as the nitrating agent. Although other acyl nitrates including propionyl nitrate, butyryl nitrate, pentanoyl nitrate, hexanoyl nitrate, benzoyl nitrate, and the like, may be utilized as a nitrating agent, acetyl nitrate is generally employed. In the nitration of a halobenzene by this latter method, the overall yield of the nitrohalobenzene nitration product is considerably improved by the inclusion of a catalytic amount of sulfuric acid, perchloric acid, hydrofluoric acid, or the like. The nitrohalobenzene products are in general valuable chemical intermediates in the production of dyes, and also in the production of inhibitors or antiozonants for rubber, gasoline, and the like. In many cases, products prepared from the para isomer of a nitrohalobenzene possess superior qualities with respect to their intended application. For example, it is known that N-phenyl-N'-cyclohexyl-p-phenylenediamine is a particularly effective antiozonant for rubber. The preparation of this highly useful compound is initially dependent upon the preparation of p-nitrochlorobenzene—a product of the method of this invention—which, upon condensation with aniline, followed by reductive alkylation with cyclohexanone, is converted to the desired N-phenyl-N'-cyclohexyl-p-phenylenediamine.

It is an object of this invention to present an improvement in the method of nitrating halobenzenes with an acyl nitrate nitrating agent. It is a more specific object to present a novel method for increasing the amount of the para isomer of a nitrohalobenzene nitration product resulting from the nitration of a halobenzene with an acyl nitrate nitrating agent.

The present invention relates to the nitration of a halobenzene with an acyl nitrate and, in one of its broad aspects, embodies an improvement which comprises increasing the amount of the para isomer in the nitrohalobenzene nitration product by nitrating said halobenzene with said acyl nitrate in an alkyl halide solvent.

Another embodiment of this invention relates to an improvement in the acid catalyzed nitration of a halobenzene with an acyl nitrate which comprises increasing the amount of the para isomer in the nitrohalobenzene nitration product by nitrating said halobenzene with said acyl nitrate in an alkyl halide solvent, said solvent comprising an alkyl halide wherein the ratio of halogen to hydrogen is at least 1:1.

One specific embodiment of the present invention relates to an improvement in the nitration of chlorobenzene with acetyl nitrate which comprises increasing the amount of the p-nitrochlorobenzene in the nitrochlorobenzene nitration product by nitrating said nitrochlorobenzene with acetyl nitrate in carbon tetrachloride solution.

Other objects and embodiments of the present invention will become apparent in the following detailed specifications.

In accordance with the method of this invention a halobenzene is nitrated with an acyl nitrate in an alkyl halide solvent. Suitable alkyl halides include methylene chloride,
methylene iodide,
methylene bromide,
methylene fluoride,
chloroform,
iodoform,
bromoform,
fluoroform,
carbontetrachloride,
carbontetraiodide,
carbontetrabromide,
carbontetrafluoride,
1,1,1-trichloroethane,
1,1,2-trichloroethane,
1,1,1-triiodoethane,
1,1,2-triiodoethane,
1,1,1-tribromoethane,
1,1,2-tribromoethane,
1,1,1-trifluoroethane,
1,1,2-trifluoroethane,
1,1,1-trichloro-2,2,2-trifluoroethane,
1,1,2-trichloro-1,2,2-trifluoroethane,
1,1,1,2-tetrachloro-2,2-difluoroethane,
1,1,2,2-tetrachloro-1,2-difluoroethane,
1,1,1-trichloro-2,2,2-tribromoethane,
1,1,2,2-tetrachloro-1,2-dibromoethane,
1,1,1,2-tetrachloropropane,
1,1,1,3-tetrachloropropane,
1,1,3,3-tetrachloropropane,
octachloropropane,
1,1,1,2-tetrabromopropane,
1,1,3,3-tetrabromopropane,
octabromopropane,
1,1,1,2-tetrafluoropropane,
1,1,3,3-tetrafluoropropane,
octafluoropropane,
1,1,1,2-tetraiodopropane,
1,1,3,3-tetraiodopropane,
octaiodopropane,
1,1,1,4,4-pentachlorobutane,
decachlorobutane,
1,1,1,5,5-hexachloropentane,
dodecachloropentane, and higher molecular weight alkyl halides. The alkyl halide is preferably one wherein the halogen-hydrogen ratio is equal to, or greater than, 1. It is further preferred to utilize an alkyl halide containing up to about 6 carbon atoms although the higher molecular weight alkyl halides containing up to 20 or more carbon atoms, are operable. Suitable alkyl halides also include the cycloalkyl halides, for example 1,2,3,4,5-pentachlorocyclopentane, 1,3,3,4,4-pentachlorocyclopentane, decachlorocyclopentane, 1,2,3,4,5-pentabromocyclopentane, 1,2,3,4,5,6-hexachlorocyclohexene, 1,2,3,4,5,6-hexabromocyclohexane, dodecachlorocyclohexane, etc.

The method of this invention finds specific utility with respect to nitratable halobenzenes subject to the ortho-para directing influence of the halo substituent, or substituents, wherein the position para to the halo substituent, and at least one position ortho thereto, are open to nitration. The present invention is particularly applicable to the nitration of the monohalobenzenes, i.e., chlorobenzene, bromobenzene, fluorobenzene, and iodobenzene. It is contemplated that the method of this invention in effect inhibits the ortho directing influence of the halo substituent and thereby effects an increase in the amount of the para isomer in the nitrohalobenzene nitration product, the para position being open to nitration. For example, in the nitration of 1,2-dichlorobenzene, substitution on the aromatic nucleus is inhibited in a position ortho to either of the chloro substituents so that nitration occurs principally in a position para to either of the chloro substituents to give primarily a 1,2-dichloro-4-nitrobenzene nitration product. The method of this invention is thus further applicable to the nitration 1,2-dibromobenzene, 1,2-difluorobenzene, 1,2-diiodobenzene, 1,2,3-trichlorobenzene, 1,2,3-tribromobenzene, 1,2,3-trifluorobenzene, 1,2,3-triiodobenzene, o-chlorotoluene, o-bromotoluene, o-fluorotoluene, o-iodotoluene, m-chlorotoluene, m-bromotoluene, m-fluorotoluene, m-iodotoluene, etc., and many other nitratable halobenzenes which will be apparent to those skilled in the art.

Nitration of halobenzenes in accordance with the method of this invention may be effected in a batch or continuous type of operation by any conventional or otherwise convenient means. One suitable method of operation comprises a batch type of operation using a reaction vessel equipped with adequate means of mixing and cooling the vessel contents. The acyl nitrate, usually acetyl nitrate, is added by means of a dropping funnel, or otherwise, to a stirred mixture comprising the halobenzene, alkylhalide, and catalyst, at nitration reaction conditions. Alternatively, the acetyl nitrate may be prepared in situ. For example, acetyl chloride is added to a stirred mixture comprising anhydrous silver nitrate, halobenzene, alkylhalide, and catalyst. Also, the acetyl nitrate may be prepared in situ by the addition of nitric acid to a stirred mixture of acetic anhydride, halobenzene, alkylhalide, and catalyst. The halobenzene and acetyl nitrate are generally utilized in about equimolar amounts. A quantity of alkyl halide sufficient to effect an acyl nitrate-alkylhalide ratio of from about 0.1 to 9 or more in the reaction mixture may be utilized. A ratio of from about 0.3 to 1 to about 3 to 1 is preferred. On completion of the nitration reaction the reaction mixture is hydrolyzed and thereafter neutralized with aqueous caustic solution. The resulting aqueous layer is separated and extracted one or more times with benzene, and the benzene extract combined with the organic layer. The organic layer is thereafter dried and the nitrohalobenzene product, unreacted starting materials, and alkylhalide solvent, are separated by fractional distillation. In a continuous flow type of operation the halobenzene and acyl nitrate starting materials are continuously charged in separate streams to a reactor equipped with suitable mixing and cooling means and maintained at nitration reaction conditions. The alkyl halide solvent may be charged in a separate stream or in conjunction with the halobenzene and/or in conjunction with the acyl nitrate. The reactor effluent is continuously withdrawn from the reactor at a rate which will insure an adequate residence time therein. The reaction mixture is treated as previously described and the unreacted starting materials recycled in combination with a fresh charge of the same.

The following examples are presented in illustration of the method of this invention. It is not intended that said examples serve to limit the generally broad scope of this invention as set out in the appended claims.

*Example I*

This example is presented to illustrate isomer distribution of a nitrohalobenzene nitration product resulting from the nitration of a halobenzene with an acyl nitrate in the absence of an alkyl halide solvent. Over a period of about 1.5 hours, acetyl nitrate, prepared from 0.25 mole of 90% nitric acid and 0.375 mole of acetic anhydride, was added to a stirred solution comprising 0.5 mole of chlorobenzene and about .001 mole of sulfuric acid. The nitration of the reaction mixture was maintained at about 25° C. After a total reaction time of about 3 hours, the reaction mixture was poured over crushed ice and thereafter neutralized with 20% sodium hydroxide solution. The resulting aqueous layer was separated from the organic layer and extracted about 4 times with benzene. The benzene extract was then combined with the organic layer and dried over anhydrous sodium sulfate. After separation of the benzene by distillation the remainder of the reaction mixture was analyzed by gas-liquid chromatography methods. The yield of nitrochlorobenzene product, based on the quantity of acetyl nitrate charged, was about 67% of which about 80% was the para isomer and about 19.4% the ortho isomer, and about 0.5% the meta isomer.

*Example II*

This example is substantially the same as the previous example with the exception that the acetyl nitrate was added to a stirred solution comprising 0.5 mole of carbontetrachloride in addition to the aforesaid benzene and sulfuric acid catalyst. After a total reaction time of about 3 hours the reaction mixture was poured over fresh ice, neutralized with 20% sodium hydroxide solution, and further treated as described in Example I. The yield of nitrochlorobenzene in this case mounted to about a 69% yield based on the quantity of acetyl nitrate charged of which about 85% was the paraisomer, about 14.9% the ortho isomer, and about 0.1% the meta isomer.

*Example III*

Acetyl nitrate, prepared from 0.25 mole of 90% nitric acid and 0.375 mole of acetic anhydride, was added to a stirred mixture comprising 0.5 mole of chlorobenzene, 0.5 mole of chloroform, and about .001 mole of sulfuric acid over a period of about 1.5 hours. The temperature of the reaction mixture was maintained at about 25° C. After a total reaction time of about 3 hours, the reaction mixture was poured over crushed ice and thereafter neutralized with 20% sodium hydroxide solution, and further treated as described in Example I. The yield of nitrochlorobenzene in this case amounted to about a 70% yield based on the quantity of acetyl nitrate charged, of which about 82% was the para isomer and about 18% was the ortho isomer.

*Example IV*

A nitrohalobenzene nitration product comprising an excess of about 80% p-nitrochlorobenzene is prepared by adding about 0.5 mole of acetyl nitrate to a stirred mixture comprising about 0.5 mole of chlorobenzene, .001 mole of sulfuric acid, and 0.5 mole of 1,1,2,2-tetrachloroethane. The acetyl nitrate is added over a period of about 1.5 hours while maintaining the reaction mixture at about 25° C. The reaction is continued for a total reaction time of approximately 3 hours. Thereafter the reaction mixture is treated with crushed ice, neutralized with 20% caustic solution, and further treated in the manner described in Example I.

*Example V*

About 0.5 mole of acetyl nitrate is added to a stirred mixture comprising about 0.5 mole of chlorobenzene, 0.5 mole of 1,1,2-tribromoethane, and about .001 mole of sulfuric acid over a period of about 1.5 hours. The temperature of the reaction mixture was maintained at about 25° C. After a total reaction time of about 3 hours, the reaction mixture was treated with crushed ice and thereafter neutralized with 20% caustic solution and further treated as described in Example I. A nitrochlorobenzene nitration product comprising in excess of about 80% p-nitrochlorobenzene is recovered.

I claim as my invention:

1. In the nitration of a halobenzene with an acylnitrate, the improvement which comprises increasing the amount of the para isomer in the nitrohalobenzene nitration product by nitrating said halobenzene with said acyl nitrate in an alkyl halide solvent.

2. The process of claim 1 further characterized in that the ratio of halogen to hydrogen in said alkyl halide is at least about 1:1.

3. The process of claim 2 further characterized in that said alkylhalide contains up to about 7 carbon atoms.

4. In the acid catalyzed nitration of a halobenzene with an acyl nitrate, the improvement which comprises increasing the amount of the para isomer in the nitrohalobenzene nitration product by nitrating said halobenzene with said acyl nitrate in an alkyl halide solvent.

5. The process of claim 4 further characterized in that the ratio of halogen to hydrogen in said alkylhalide is at least 1:1.

6. The process of claim 5 further characterized in that said alkyl halide contains up to about 7 carbon atoms.

7. In the acid catalyzed nitration of chlorobenzene with acetyl nitrate, the improvement which comprises increasing the amount of the p-nitrochlorobenzene in the nitrochlorobenzene nitration product by nitrating said nitrochlorobenzene with said acetyl nitrate in carbontetrachloride solution.

8. In the acid catalyzed nitration of chlorobenzene with acetyl nitrate, the improvement which comprises increasing the amount of p-nitrochlorobenzene in the nitrochlorobenzene nitration product by nitrating said chlorobenzene with said acetyl nitrate in chloroform solution.

9. In the acid catalyzed nitration of chlorobenzene with acetyl nitrate, the improvement which comprises increasing the amount of p-nitrochlorobenzene in the nitrochlorobenzene nitration product by nitrating said chlorobenzene with said acetyl nitrate in 1,1,2,2-tetrachloroethane solution.

10. In the acid catalyzed nitration of chlorobenzene with acetyl nitrate, the improvement which comprises increasing the amount of the p-nitrochlorobenzene in the nitrochlorobenzene nitration product by nitrating said nitrochlorobenzene with said acetyl nitrate in 1,1,2-tribromoethane solution.

11. In the acid catalyzed nitration of chlorobenzene with acetyl nitrate, the improvement which comprises increasing the amount of p-nitrochlorobenzene in the nitrochlorobenzene nitration product by nitrating said chlorobenzene with said acetyl nitrate in 1,1,2-trichloroethane solution.

References Cited by the Examiner

Paul: J.A.C.S. 80, pp. 5332 and 5333 (1958).

CARL D. QUARFORTH, *Primary Examiner.*